United States Patent [19]

Ogawa

[11] Patent Number: 5,357,497
[45] Date of Patent: Oct. 18, 1994

[54] METHOD FOR DETECTING DEFECTS ON MAGNETO-OPTIC RECORDING MEDIUM

[75] Inventor: Kenichi Ogawa, Tsurugashima, Japan

[73] Assignee: Pioneer Electronic Corporation, Tokyo, Japan

[21] Appl. No.: 824,562

[22] Filed: Jan. 23, 1992

[30] Foreign Application Priority Data

Jul. 5, 1991 [JP] Japan .................................. 3-165962

[51] Int. Cl.$^5$ .......................... G11B 3/90; G11B 5/09; G11B 5/02
[52] U.S. Cl. ...................................... 369/58; 360/59; 360/46
[58] Field of Search ....................... 360/46, 59, 39, 67; 369/44, 32, 54, 58; 371/21.1

[56] References Cited

U.S. PATENT DOCUMENTS 4,346,411  8/1982  Buhler et al. .......................... 360/67

*Primary Examiner*—Donald Hajec
*Assistant Examiner*—T. N. Forbus, Jr.
*Attorney, Agent, or Firm*—Sughrue, Mion, Zinn, Macpeak and Seas

[57] ABSTRACT

A method for detecting defects by detecting defects a magneto-optic property of a magneto-optic recording medium. A signal with constant frequency is recorded on a recording layer of the magneto-optic recording medium, and positive and negative side waveforms of the reproduced constant frequency signal obtained through play of the recording medium are integrated separately. The level of each of these integrated values and a reference level are compared, and a level drop of the peak value is detected.

3 Claims, 3 Drawing Sheets

METHOD FOR DETECTING DEFECTS ON MAGNETO-OPTIC RECORDING MEDIUM

BACKGROUND OF THE INVENTION

1. Field of the Invention

The present invention relates to a method for detecting defects on a magneto-optic recording medium such as a magneto-optic disk.

2. Description of the Prior Art

Among magneto-optic recording medium manufactured at factories, there are some products which have magneto-optic layers with uneven magneto-optic property, and it is necessary to inspect these products. However, no effective method is known for checking such non-uniformity of the recording layer of a magneto-optic disk up to now.

SUMMARY OF THE INVENTION

To solve the above problem, it is an object of the present invention to provide a method for inspecting defects on a magneto-optic recording medium and for detecting defects in magneto-optic property of the magneto-optic recording medium.

The method for detecting defects on a magneto-optic recording medium according to the present invention is to record a signal with a constant frequency on a recording layer of a magneto-optic recording medium, to independently integrate positive and negative waveforms of a reproduction signal obtained through play of the above recording medium, and to check and identify defects by comparing the level of each integrated value with reference level and by detecting a level drop of each peak value of the reproduction signal.

DETAILED DESCRIPTION OF A PREFERRED EMBODIMENT

In the following, description will be given on an embodiment of the invention in connection with the accompanying drawings.

Figure 1:
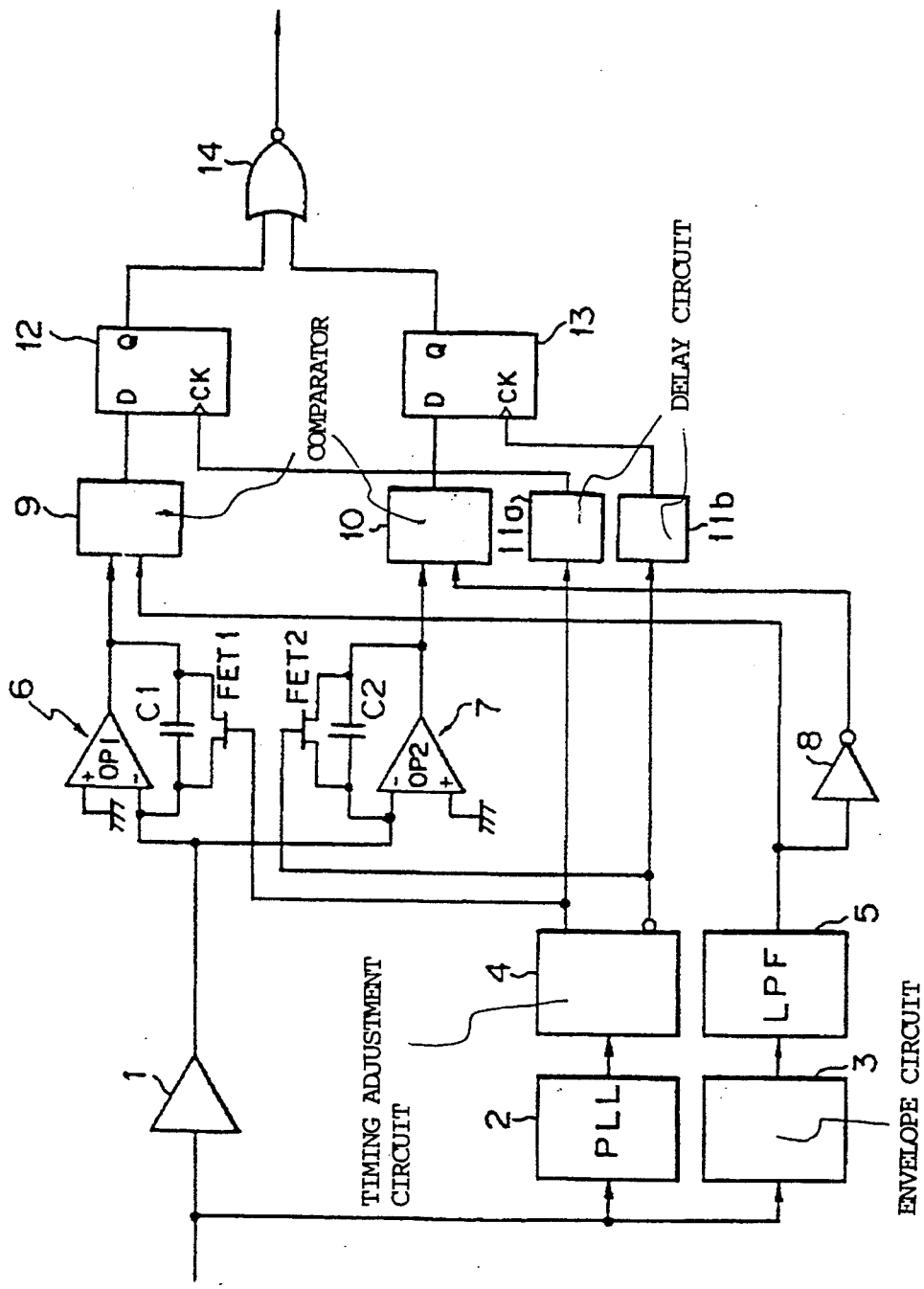
FIG. 1 is a circuit diagram showing a defect detection circuit to be used for executing a method according to the present invention.
Figure 2:
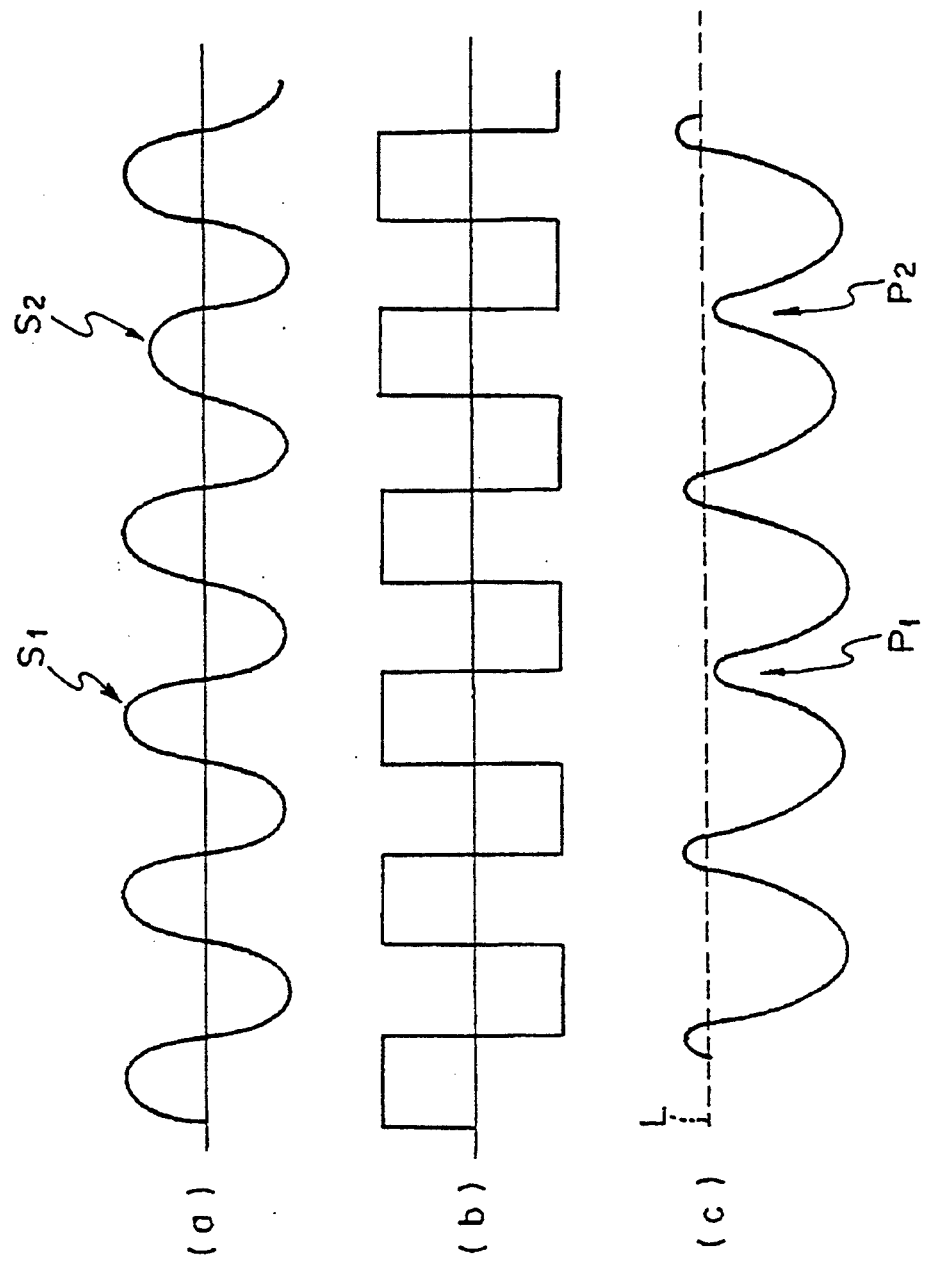
FIG. 2 represents waveform diagrams showing signal waveforms in the circuit of FIG. 1.

FIG. 1 shows a defect detecting circuit for executing the method for detecting defects according to the present invention. In this circuit, a reproduced signal is obtained from a magneto-optic disk player which plays a magneto-optic disk as a magneto-optic recording medium and is supplied to an amplifier 1, a PLL circuit 2, and an envelope detection circuit 3. In this case, a test signal containing a constant frequency component is recorded over the entire track, and the reproduced signal has such a waveform as shown in FIG. 2(a). The PLL circuit 2 is a PLL circuit with a known arrangement, and it generates a frequency signal having a frequency slowly following to actual frequency fluctuations of the constant frequency component in an input signal.

Figure 3:
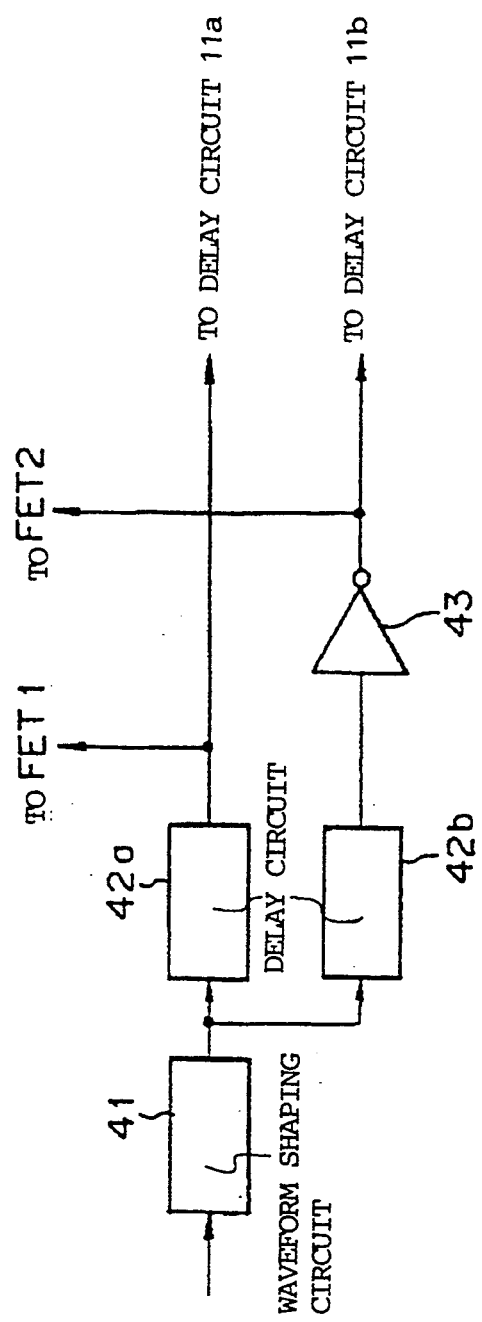
FIG. 3 is a partial enlarged view of the circuit of FIG. 1.

The signal from the PLL circuit 21 is supplied as an integrated command signal to a positive side waveform integration circuit 6 to integrate only positive components of the reproduced signal amplified by an amplifier 1 through a timing adjustment circuit 4 and to a negative waveform integration circuit 7 to integrate only negative components. The positive side waveform integration circuit 6 comprises an operational amplifier OP1, a capacitor C1 and a field effect transistor FET1 to short-circuit between two terminals of the capacitor 1 by passing an electric current through the above integration command signal. The negative side waveform integration circuit 7 comprises an operational amplifier OP2, a capacitor C2 and a field effect transistor FET2 and has the same arrangement as the positive side integration circuit 6. The timing adjustment circuit 4 comprises, a waveform shaping circuit 41, delay circuits 42a and 42b and an inverter 43 as shown in FIG. 3 for example, and produces a pair of square wave signals as integration command signals. The square wave signals are delayed from a sine wave input signal by a predetermined time and respectively have the same period as the input signal. These square wave signals have phases opposite to each other. The output from an envelope detection circuit 3 is sent to a comparator 9 through a low-pass filter 5. A signal of the output from the low-pass filter 5 passing through an inverter 8 is inputted to a comparator 10. The comparator 9 compares an integral signal having the positive side waveform only by the positive side waveform integration circuit 6 with low frequency components of envelope detection signal from the low-pass filter 5. The comparator 10 compares integral signals having negative side waveform only by the negative side waveform integrating circuit 7 with low frequency components of envelope detection signal from the low-pass filter 5. A flip-flop 12 incorporates a signal obtained through comparison by the comparator 9 at a rise-up timing of a signal, which is obtained by delaying the integration command signal from the timing adjustment circuit 4 by a delay circuit 11a. A flip-flop 13 incorporates a signal obtained through comparison by the comparator 10 at a rise-up timing of a signal, which is obtained by delaying the integration command signal (delayed by ½ period of the positive side waveform integration command signal) from a delay circuit 4. The signal from the flip-flop 12 and the signal from the flip-flop 13 are logically summed by an OR circuit 14, and this is outputted as a defect detecting signal.

When a frequency signal shown in FIG. 2(a) is sent to the positive and negative side waveform integration circuits 6 and 7 from the amplifier 1, such an integration command signal as shown in FIG. 2(b) is supplied to the integration circuit 6 from the timing adjustment circuit 4. To the negative side waveform integration circuit 7 is supplied an integration command signal (not shown) of an opposite phase to the waveform of FIG. 2(b). When such signal is sent to the positive side waveform integration circuit 6, an integration output shown in FIG. 2(c) is obtained. In this integration waveform, low peak portions $P_1$ and $P_2$ of low peak values lower than reference level L correspond to waveforms $S_1$ and $S_2$ of FIG. 2(a). The waveform $S_1$ corresponds to a case where a pit shorter than the waveform of the original recording signal is formed by defect on the magneto-optic recording layer. The waveform $S_2$ corresponds to a case where a pit having insufficient magnetization compared with the waveform of the original recording signal due to defect on the magneto-optic layer is formed. Therefore, it is possible according to the present invention to detect defects as a level drop of the positive and negative side waveform integrating values generated depending on the defects, regardless the aspect or manner of the defects on the magneto-optic layer.

In the present invention, constant frequency signal is recorded on the magneto-optic recording medium and defects can be detected by a level drop in each of the integrated values obtained through independent integration of the reproduced signal on positive and negative sides. Accordingly, it is possible to detect characteristic defects on the magneto-optic recording medium quickly and correctly.

What is claimed is:

1. A method for detecting defects on a magneto-optic recording medium, comprising: a recording step for recording a constant frequency signal on said magneto-optic recording medium, a reproducing step for reproducing the constant frequency signal by playing the magneto-optic disk, an integrating step for separately integrating positive and negative side waveforms of the reproduced signal, and a detecting step for comparing a peak value from either of the integrated outputs with a reference value and for detecting a level drop thereof.

2. A method for detecting defects on a magneto-optic recording medium according to claim 1, wherein said basic frequency component is extracted by a PLL circuit in said integrating step.

3. A method for detecting defects on a magneto-optic recording medium according to claim 1, wherein an envelope detection value of said reproduced signal is used as said reference value in said detecting step.

* * * * *